United States Patent
Henry et al.

(10) Patent No.: US 9,026,321 B2
(45) Date of Patent: May 5, 2015

(54) SYSTEM AND METHOD FOR CONTROLLING SOIL FINISH FROM AN AGRICULTURAL IMPLEMENT

(71) Applicant: CNH Industrial Canada, Ltd., Saskatoon (CA)

(72) Inventors: Jim Henry, Saskatoon (CA); John Posselius, Ephrata, PA (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/492,563

(22) Filed: Sep. 22, 2014

(65) Prior Publication Data
US 2015/0012189 A1 Jan. 8, 2015

Related U.S. Application Data

(62) Division of application No. 13/571,071, filed on Aug. 9, 2012, now Pat. No. 8,862,339.

(51) Int. Cl.
*G06F 19/00* (2011.01)
*A01B 63/28* (2006.01)
*A01C 5/06* (2006.01)
*G06G 7/00* (2006.01)

(52) U.S. Cl.
CPC ............... *A01B 63/28* (2013.01); *A01C 5/062* (2013.01); *A01C 5/066* (2013.01)

(58) Field of Classification Search
USPC .......................................................... 701/50
See application file for complete search history.

(56) References Cited

U.S. PATENT DOCUMENTS

| | | | |
|---|---|---|---|
| 2,639,569 A | 5/1953 | Pasturczak | |
| 3,251,422 A | 5/1966 | Allgaier et al. | |
| 3,605,903 A | 9/1971 | Glesmann | |
| 3,750,762 A | 8/1973 | Eaton | |
| 4,277,898 A | 7/1981 | Flippin | |
| 4,582,141 A | 4/1986 | van der Lely | |
| 4,704,866 A | 11/1987 | Myers | |
| 6,276,462 B1 * | 8/2001 | Dietrich, Sr. | 172/138 |
| 6,315,658 B1 | 11/2001 | Weber | |
| 6,422,323 B1 * | 7/2002 | Dietrich, Sr. | 172/724 |
| 6,546,705 B2 | 4/2003 | Scarlett et al. | |
| 7,017,675 B2 * | 3/2006 | Ankenman et al. | 172/146 |
| 7,971,653 B2 * | 7/2011 | Harris, III | 172/21 |
| 2002/0043383 A1 * | 4/2002 | Dietrich, Sr. | 172/730 |
| 2003/0037935 A1 * | 2/2003 | Sauder | 172/151 |
| 2008/0308022 A1 * | 12/2008 | Ryder et al. | 111/8 |
| 2012/0050023 A1 * | 3/2012 | Sauder et al. | 340/431 |
| 2012/0054061 A1 * | 3/2012 | Fok et al. | 705/26.5 |
| 2012/0201795 A1 * | 8/2012 | Ware et al. | 424/93.45 |

FOREIGN PATENT DOCUMENTS

EP 1563722 8/2005

* cited by examiner

*Primary Examiner* — Ian Jen
(74) *Attorney, Agent, or Firm* — Rebecca L. Henkel (57) ABSTRACT

An agricultural implement system is provided that includes a row unit configured to deposit agricultural material into soil along a direction of travel. The agricultural implement system also includes a sensor configured to output a signal indicative of soil displaced by the row unit, and an implement controller communicatively coupled to the sensor. The implement controller is configured to determine a smoothness of a soil finish behind the row unit along the direction of travel based on the signal. The controller is also configured to adjust a parameter affecting the soil finish while the smoothness is outside of a desired range.

20 Claims, 5 Drawing Sheets

SYSTEM AND METHOD FOR CONTROLLING SOIL FINISH FROM AN AGRICULTURAL IMPLEMENT

CROSS-REFERENCE TO RELATED APPLICATION

This application is a divisional of U.S. patent application Ser. No. 13/571,071, entitled "SYSTEM AND METHOD FOR CONTROLLING SOIL FINISH FROM AN AGRICULTURAL IMPLEMENT", filed Aug. 9, 2012, which is herein incorporated by reference in its entirety.

BACKGROUND

The invention relates generally to ground working equipment, such as agricultural equipment, and more specifically, to a system and method for controlling soil finish from an agricultural implement.

Generally, seeding implements are towed behind a tractor or other work vehicle via a mounting bracket secured to a rigid frame of the implement. These seeding implements typically include a ground engaging tool or opener that forms a seeding path for seed deposition into the soil. The opener is used to break the soil to enable seed deposition. After the seed is deposited, the opener is followed by a packer wheel that packs the soil on top of the deposited seed.

Depositing seeds at a desired depth beneath a surface of the soil facilitates proper crop development. Accordingly, the implement may be towed at a speed that establishes a smooth soil finish across the field, thereby facilitating accurate seed placement. Unfortunately, limiting work vehicle speed increases the duration of the planting or seeding process, thereby reducing efficiency of farming operations. However, operating the work vehicle at a higher speed may establish an undesirably rough soil finish within certain regions of the field, thereby interfering with crop development.

BRIEF DESCRIPTION

In one embodiment, an agricultural implement system includes a row unit configured to deposit agricultural material into soil along a direction of travel. The agricultural implement system also includes a sensor configured to output a signal indicative of soil displaced by the row unit, and an implement controller communicatively coupled to the sensor. The implement controller is configured to determine a smoothness of a soil finish behind the row unit along the direction of travel based on the signal. The controller is also configured to adjust a parameter affecting the soil finish while the smoothness is outside of a desired range.

In another embodiment, a method for controlling soil finish from an agricultural implement system includes receiving a signal indicative of soil displaced by a row unit of the agricultural implement system as the row unit moves along a direction of travel. The method also includes determining a smoothness of a soil finish behind the row unit along the direction of travel based on the signal, and adjusting a parameter affecting the soil finish while the smoothness is outside of a desired range.

In a further embodiment, an agricultural implement system includes a row unit configured to deposit agricultural material into soil along a direction of travel. The agricultural implement system also includes a non-contact sensor directed toward a region of the soil behind the row unit along the direction of travel. The non-contact sensor is configured to output a first signal indicative of a smoothness of a soil finish within the region. The agricultural implement system further includes an implement controller communicatively coupled to the non-contact sensor. The implement controller is configured to determine a desired speed of the agricultural implement system based on the first signal, and to output a second signal indicative of the desired speed to a work vehicle controller.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
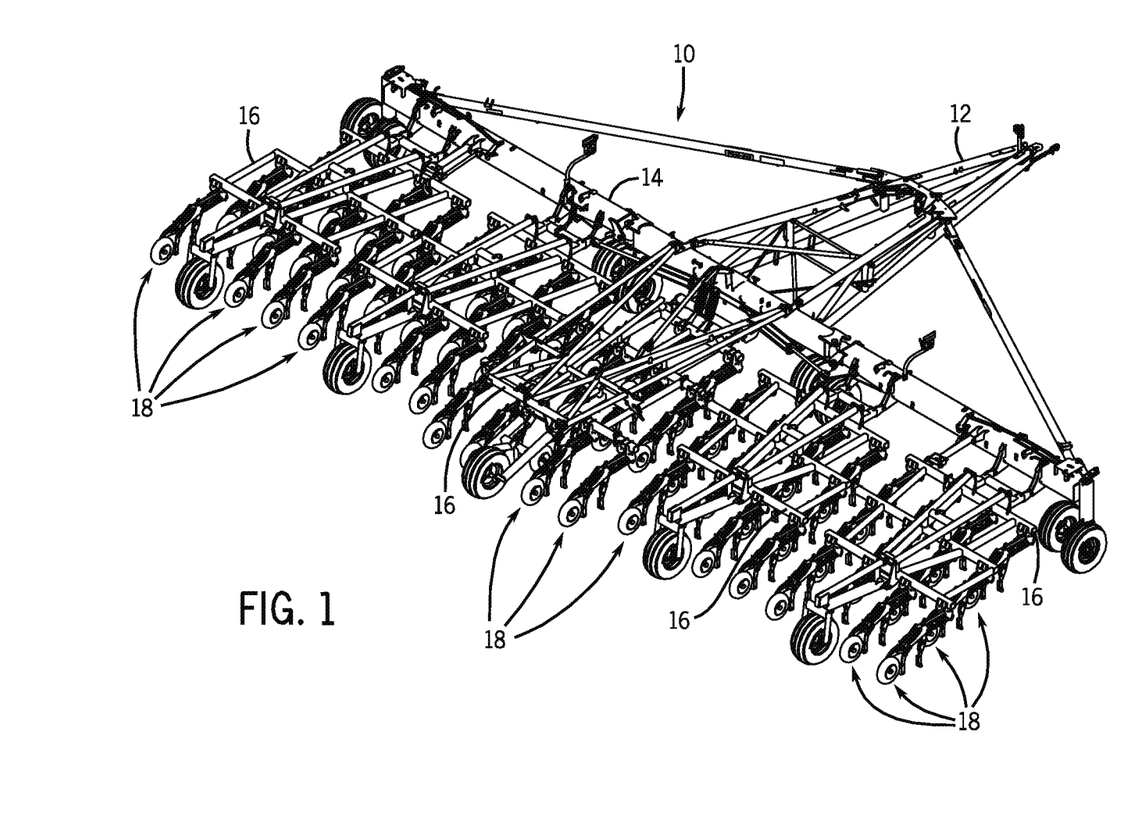
FIG. 1 is a perspective view of an exemplary agricultural implement that may include a soil finish control system.

Turning now to the drawings, FIG. 1 is a perspective view of an agricultural implement 10. The implement 10 is designed to be towed behind a work vehicle such as a tractor. The implement 10 includes a tow bar assembly 12 which is shown in the form of an A-frame hitch assembly. The tow bar assembly 12 may include a hitch used to attach to an appropriate tractor hitch via a ball, clevis, or other coupling. The tow bar assembly 12 is coupled to a tool bar 14 which supports multiple tool frames 16. Each tool frame 16 includes multiple row units 18, such as the illustrated hoe openers. As discussed in detail below, the agricultural implement 10 includes a soil finish control system configured to determine a smoothness of a soil finish behind the implement, and to adjust a parameter affecting the soil finish while the smoothness is outside of a desired range.

Figure 2:
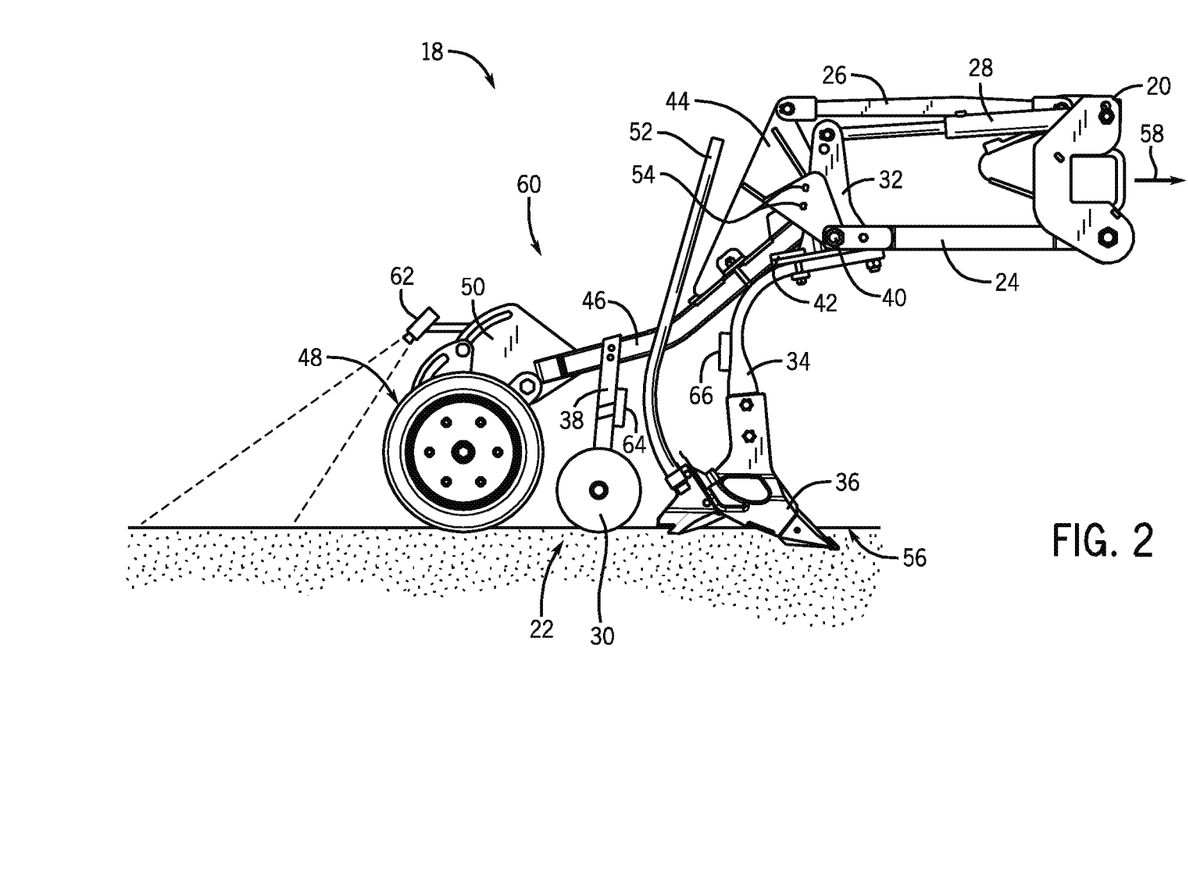
FIG. 2 is a perspective view of an exemplary row unit that may be employed within the agricultural implement of FIG. 1.

FIG. 2 is a perspective view of an exemplary row unit 18 that may be employed within the agricultural implement 10 of FIG. 1. As illustrated, the row unit 18 includes a frame support 20, a closing disk assembly 22, a first member 24, a second member 26, and an opener actuator 28, such as a linear actuator (e.g., hydraulic and/or pneumatic piston-cylinder assembly). The opener actuator 28 may be hydraulically coupled to a power supply that provides a flow of pressurized hydraulic fluid which displaces a piston rod extending from a cylinder of the actuator 28. The frame support 20 is configured to interface with the tool frame 16, thereby securing the row unit 18 to the agricultural implement 10. For instance, multiple row units 18 may be mounted in parallel along the tool frame 16 to form a seeding unit. In the illustrated embodiment, the row unit 18 enables a penetration depth of an opener to be controlled by an attached packer wheel, thereby enabling each of the openers of a seeder unit to be independently controlled for improved seeding performance. For example, the depth of a soil valley or groove created by the row unit 18 may increase as the packer wheel lowers the opener into the soil.

In the present configuration, the first member 24, the second member 26, and the frame support 20 form elements of a parallel linkage, also known as a four bar linkage. As illustrated, the closing disk assembly 22 includes at least one closing disk 30 coupled to the row unit 18 via a bracket assembly. The closing disk 30 may be arranged to direct soil into a valley, thereby establishing enhanced soil conditions for seed growth. As will be appreciated, components of the row unit 18, such as the frame support 20, the first member 24, and the second member 26, may be made of any suitable material, such as steel.

The opener actuator 28 is attached to a shank adapter 32 via a pin at the end of the piston rod. The shank adapter 32 is also coupled to a shank 34 and a ground engaging opener 36. The shank adapter 32 is coupled to the shank 34 via fasteners, thereby facilitating position adjustment of the opener 36, which, along with a packer wheel, enables a variable seeding depth for the row unit. Further, the position of the closing disk 30 may be adjusted via a bracket 38. The bracket 38 enables the closing disk 30 to direct soil in a desired direction via height and/or angular adjustments of the bracket 38. In the illustrated embodiment, a pin 40 is coupled to the first member 24 and to the shank adapter 32, thereby enabling the shank adapter 32 to pivotally rotate about the pin 40 as the opener actuator 28 extends and retracts. Accordingly, the opener 36 moves downwardly or upwardly based upon actuator extension or retraction, respectively. The shank adapter 32 includes several holes to receive a pin coupling the end of the opener actuator 28 to the adapter. The adapter holes may be used to adjust the angle of the actuator 28 with respect to the parallel linkage assembly, thereby changing the angle and magnitude of actuator forces.

As the opener actuator 28 retracts, a stop plate 42 may press on a rear frame 44, creating a lifting force that is conveyed to a packer wheel arm 46. The resulting lifting force, caused by the actuator 28, reduces the packing force of a packer wheel 48, and may eventually lift the packer wheel 48 from the terrain. In the illustrated embodiment, a packer wheel assembly 50 facilitates height adjustment of the packer wheel 48 via a fastener/slot assembly. The position of the packer wheel 48 controls the depth of a valley opened in the soil by the opener 36.

To facilitate seed deposition during operation, the opener 36 is coupled to a seed distribution header via a seeding tube 52. In the illustrated embodiment, as the terrain elevation fluctuates, the row unit moves upwardly or downwardly from the illustrated neutral position. The opener actuator 28 may be extended, thereby deploying the opener 36 downwardly into the terrain, pressing the shank adapter 32 against rear frame stops 54. The soil surface 56 may be shaped and directed by the opener 36, the closing disk assembly 22, and the packer wheel 48. Accordingly, a desired soil profile may be established.

As the row unit 18 moves along a direction of travel 58, the opener 36 excavates a trench into the soil surface 56. The seed tube 52 then deposits a seed into the trench, and the closing disk 30 covers the seed with soil displaced by the opener 36. The packer wheel 48 then packs the soil above the seed to establish a substantially smooth soil finish behind the row unit. As will be appreciated, the smoothness of the soil finish behind the row unit is at least partially dependent on the soil conditions (e.g., moisture content, soil composition, etc.) and the speed of the implement. For example, when operating the implement in a field having a higher soil density, the implement may be towed at a slower speed such that the closing disk 30 and the packer wheel 48 may provide a smooth soil finish. Conversely, when operating the implement in a field having a lower soil density, the implement may be towed at a higher speed while providing the desired soil finish. As will be appreciated, operating the implement at a higher speed increases seeding efficiency by reducing the duration of seeding operations. Accordingly, an operator may instruct a work vehicle to tow the implement at the highest speed suitable for establishing a desired soil finish.

Unfortunately, if the implement is towed through the field at a constant speed, variations in soil conditions may establish regions having an undesirable soil finish (e.g., excessively deep trenches, excessively high soil piles on opposite sides of the trench, etc.). As a result, seeds may be deposited at an undesirable depth, thereby interfering with crop development. Accordingly, the implement may be towed at a speed lower than desired, thereby increasing the duration of seeding operations and reducing seeding efficiency. In the illustrated embodiment, the implement 10 includes a soil finish control system 60 configured to determine a smoothness of a soil finish behind the row unit, and to adjust a parameter affecting the soil finish while the smoothness is outside of a desired range. As a result, the implement may establish a desired soil finish throughout a field, thereby enhancing crop development. In addition, by controlling a speed of the work vehicle, the soil finish control system 60 may enable the implement to be towed at the highest speed suitable for the local soil conditions.

As discussed in detail below, the soil finish control system 60 includes a sensor configured to output a signal indicative of soil displaced by the row unit, and an implement controller communicatively coupled to the sensor. The implement controller is configured to determine a smoothness of a soil finish behind the row unit along the direction of travel based on the signal. The controller is also configured to adjust a parameter affecting the soil finish (e.g., implement speed, opener angle, etc.) while the smoothness is outside of a desired range. Accordingly, the soil finish control system 60 may automatically compensate for variations in soil conditions, thereby enabling the implement to be towed at a higher average speed through the field.

In the illustrated embodiment, the soil finish control system 60 includes a non-contact sensor 62 directed toward a region of the soil behind the row unit 18 along the direction of travel 58. As discussed in detail below, the non-contact sensor 62 is configured to monitor a height and/or a width of soil displaced by the row unit 18, thereby enabling the implement controller to determine a smoothness of the soil finish behind the row unit. In certain embodiments, the non-contact sensor 62 may include an optical camera configured to provide images to the implement controller indicative of the soil displaced by the row unit. In addition, further embodiments may include another non-contact sensor, such as an active infrared transducer, a passive infrared camera, an ultrasonic transducer, or a radio frequency transducer, for example.

In the illustrated embodiment, the soil finish control system 60 also includes a load sensor 64 configured to measure a contact force between the closing disk 30 and the soil 56. In certain embodiments, the load sensor 64 may include a strain gauge coupled to the bracket 38, and configured to measure contact force based on deflection of the bracket. In further embodiments, the load sensor may include a piezoelectric transducer, a mechanical deflection sensor, a microelectromechanical (MEMS) sensor, or any other suitable device for measuring a force applied to the closing disk 30. As will be appreciated, a higher load on the closing disk 30 may be indicative of increased soil displacement, and a lower load on the closing disk 30 may be indicative of decreased soil displacement. Accordingly, the load sensor 64 is configured to output a signal (e.g., in the form of a contact force measurement) indicative of soil displaced by the row unit.

The illustrated soil finish control system 60 also includes a load sensor 66 configured to measure a contact force between the opener 36 and the soil 56. In certain embodiments, the load sensor 66 may include a strain gauge coupled to the shank 34, and configured to measure contact force based on deflection of the shank. In further embodiments, the load sensor may include a piezoelectric transducer, a mechanical deflection sensor, a microelectromechanical (MEMS) sensor, or any other suitable device for measuring a force applied to the opener 36. As will be appreciated, a higher load on the opener 36 may be indicative of increased soil displacement, and a lower load on the opener 36 may be indicative of decreased soil displacement. Accordingly, the load sensor 66 is configured to output a signal (e.g., in the form of a contact force measurement) indicative of soil displaced by the row unit.

As discussed in detail below, the soil finish control system 60 includes a controller communicatively coupled to the sensors (e.g., the non-contact sensor 62, the closing disk load sensor 64, and/or the opener load sensor 66). The controller is configured to determine a smoothness of a soil finish behind the row unit along the direction of travel based on a signal from the sensors indicative of soil displaced by the row unit. The controller is also configured to adjust a parameter affecting the soil finish while the smoothness is outside of a desired range. For example, if the soil finish is less smooth than desired, the controller may instruct a work vehicle to decrease the speed at which the implement is towed across a field. The slower speed may provide a smoother soil finish, thereby enhancing seed placement accuracy. Conversely, if the soil finish is smoother than desired, the controller may instruct the work vehicle to increase the speed of the implement, thereby reducing the duration associated with seeding operations.

In addition, the controller may be configured to adjust an angle of the opener 36 relative to the soil surface 56 to vary the smoothness of the soil finish. For example, if the soil finish is less smooth than desired, the controller may instruct the opener actuator 28 to decrease an angle between the opener 36 and the soil surface 56. The shallower angle may reduce the soil displaced by the opener, thereby providing a smoother soil finish, and enhancing seed placement accuracy. Conversely, if the soil finish is smoother than desired, the controller may instruct the opener actuator 28 to increase the angle between the opener 36 and the soil surface 56, thereby increasing soil displacement and providing a rougher soil finish.

While the illustrated embodiment includes three sensors (e.g., the non-contact sensor 62, the closing disk load sensor 64, and the opener load sensor 66), it should be appreciated that alternative embodiments may include one or two sensors configured to monitor soil displaced by the row unit. In addition, it should be appreciated that certain row units may include additional ground engaging tools (e.g., a second opener, etc.). In such configurations, the row unit may include a load sensor configured to measure a contact force between the additional ground engaging tool and the soil. Furthermore, while the illustrated embodiment includes a closing disk assembly 22 having a closing disk 30, it should be appreciated that alternative embodiments of the row unit 18 may omit the closing disk assembly 22. In such embodiments, the packer wheel 48 may be spaced from the opener 36 by a distance that enables at least a portion of the soil displaced by the opener 36 to fall into the seed trench before the packer wheel 48 packs the soil. As will be appreciated, such embodiments may omit the closing disk load sensor 64.

It should also be appreciated that the row unit may include any suitable number of ground engaging tools, and/or ground engaging tools of any suitable configuration. For example, in certain embodiments, the row unit may include a single ground engaging tool (e.g., an opener, a coulter, a disc blade, a packer wheel, a closing disk, etc.). In such embodiments, the soil finish control system may monitor the soil displaced by the single ground engaging tool (e.g., via a non-contact sensor, or a load sensor mounted to the tool). The soil finish control system may then determine a smoothness of a soil finish behind the ground engaging tool based on the displaced soil. A parameter affecting the soil finish may then be adjusted to establish a desired smoothness. For example, the soil finish control system may instruct a work vehicle to adjust a towing speed of the implement based on the smoothness of the soil finish. In addition, the soil finish control system may adjust an angle of the single ground engaging tool relative to the soil surface to achieve the desired smoothness.

Figure 3:
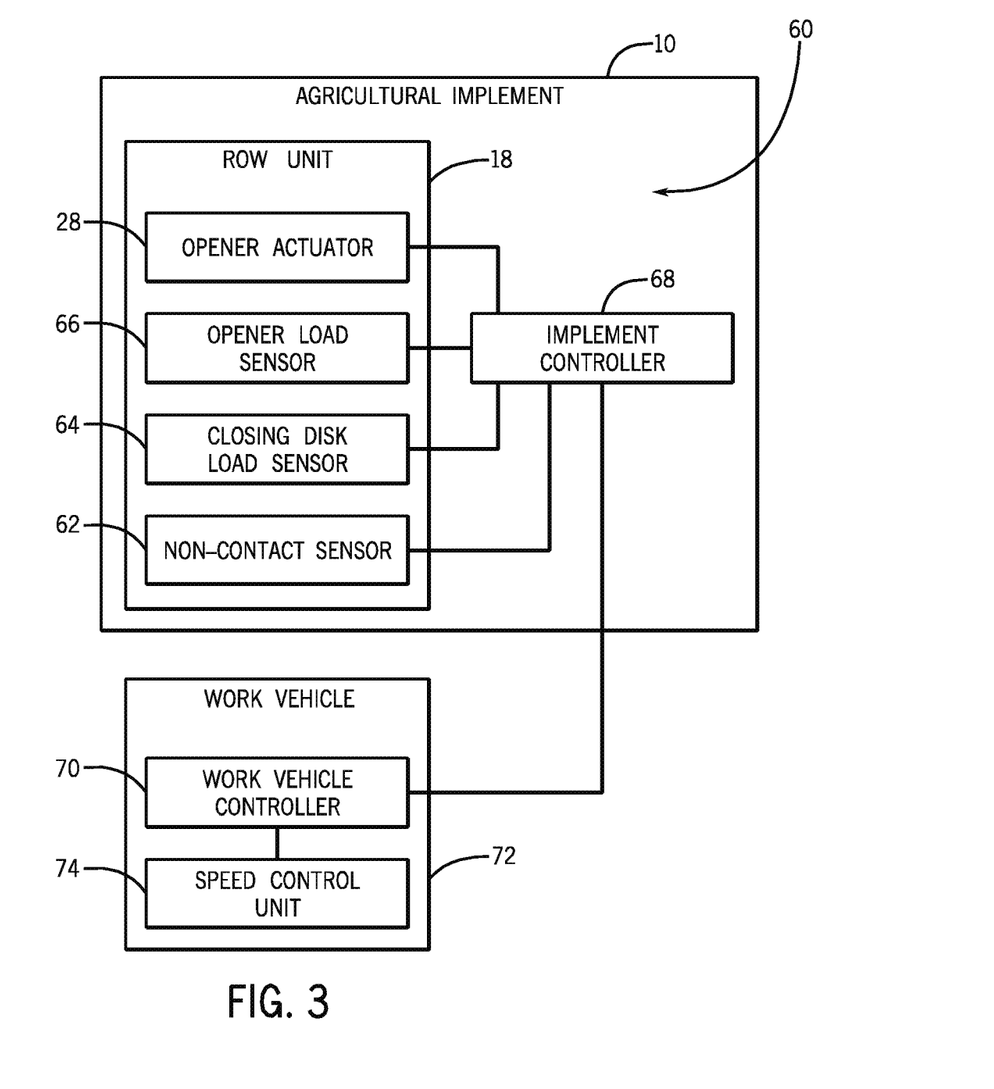
FIG. 3 is a schematic diagram of an embodiment of a soil finish control system that may be employed within the agricultural implement of FIG. 1.

FIG. 3 is a schematic diagram of an embodiment of a soil finish control system 60 that may be employed within the agricultural implement 10 of FIG. 1. In the illustrated embodiment, the agricultural implement 10 includes a row unit 18 having an opener actuator 28, an opener load sensor 66, a closing disk load sensor 64, and a non-contact sensor 62. As previously discussed, the opener load sensor 66, the closing disk load sensor 64, and/or the non-contact sensor 62 are configured to output a signal indicative of soil displaced by the row unit. In the illustrated embodiment, the implement 10 includes an implement controller 68 communicatively coupled to the opener load sensor 66, the closing disk load sensor 64, and the non-contact sensor 62. The controller 68 is configured to determine a smoothness of a soil finish behind the row unit along the direction of travel based on the signal from the sensors. The controller 68 is also configured to adjust a parameter affecting the soil finish while the smoothness is outside of a desired range.

As illustrated, the controller 68 is communicatively coupled to the opener actuator 28. Accordingly, the controller 68 may instruct the opener actuator 28 to adjust an angle of the opener to achieve a desired soil finish. For example, if the soil finish is less smooth than desired, the controller 68 may instruct the opener actuator 28 to decrease the angle of the opener relative to the soil surface. Conversely, if the soil finish is smoother than desired, the controller 68 may instruct the opener actuator 28 to increase the angle of the opener relative to the soil surface. In this manner, the soil finish control system 60 may establish a desired soil finish across a field.

In addition, the implement controller 68 is communicatively coupled to a work vehicle controller 70 within a work vehicle 72. As previously discussed, the work vehicle 72 is configured to tow the agricultural implement 10 across the field. In the illustrated embodiment, the implement controller 68 is configured to determine a desired speed of the agricultural implement based on a determined/measured smoothness of the soil finish. The controller 68 is also configured to output a signal indicative of the desired speed to the work vehicle controller 70. The work vehicle controller 70, in turn, is configured to instruct a speed control unit 74 to adjust the speed of the work vehicle, thereby towing the agricultural implement at the desired speed.

By way of example, the non-contact sensor 62 may output a signal indicative of a smoothness of a soil finish within a region behind the row unit 18. The implement controller 68 may then determine a desired speed of the agricultural implement based on the signal, and output a second signal indicative of the desired speed to the work vehicle controller 70. For example, if the soil finish is smoother than desired, the implement controller 68 may instruct the work vehicle to increase speed. Conversely, if the soil finish is less smooth than desired, the implement controller 68 may instruct the work vehicle to decrease speed. As a result, the speed of the implement may be adjusted to provide a desired soil finish, while reducing the duration associated with seeding operations.

In certain embodiments, each row unit includes one or more sensors configured to monitor soil displaced by the row unit. In such embodiments, the implement controller 68 may be configured to average the monitored soil displacement across all of the row units to determine a smoothness of the soil finish. Alternatively, the controller 68 may be configured to determine a smoothness of the soil finish based on the largest monitored soil displacement. In further embodiments, the controller 68 may be configured to average the monitored soil displacement across various regions of the implement, and determine a smoothness of the soil finish based on the region having the largest average soil displacement. In addition, it should be appreciated that the controller 68 may employ various statistical analysis techniques to determine a smoothness of the soil finish based on the monitored soil displacement.

Furthermore, a single sensor (e.g., a non-contact sensor) may monitor the soil displaced by each row unit of the implement. In such an embodiment, a smoothness of the soil finish may be determined based on the soil displacement monitored by the sensor. For example, an optical camera may be directed toward a region behind the row units. The optical camera may be configured to output a signal indicative of soil displaced by each of the row units, thereby enabling the implement controller to determined a smoothness of the soil finish based on the soil displacement (e.g., by averaging the soil displaced by each row unit). In further embodiments, multiple sensor (e.g., one sensor per tool frame) may be employed to monitor the soil displacement.

Figure 4:
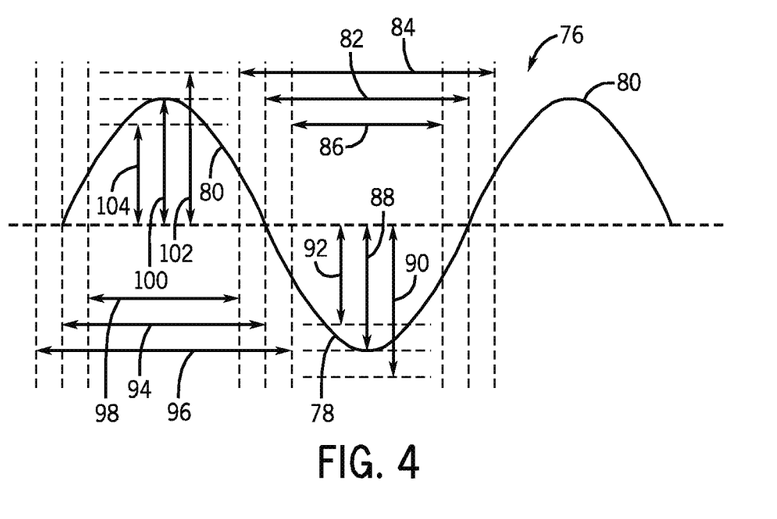
FIG. 4 is an exemplary profile view of a soil finish produced by the row unit of FIG. 2.

FIG. 4 is an exemplary profile view of a soil finish 74 produced by the row unit 18 of FIG. 2. As illustrated, the soil finish includes a trench 78, and piles 80 positioned on opposite lateral sides of the trench. A smoothness of the soil finish may be evaluated based on a width of the trench 78, a depth of the trench 78, a width of the pile 80, and/or a height of the pile 80. For example, the implement controller may determine that the soil profile is less smooth than desired if a width 82 of the trench 78 is greater than a maximum threshold width 84. Conversely, the implement controller may determine that the soil profile is smoother than desired if the width 82 of the trench 78 is less than a minimum threshold width 86. By way of example, while the trench width 82 is greater than the maximum threshold width 84, the implement controller may instruct the work vehicle to decrease speed to provide a smoother soil finish. Conversely, while the trench width 82 is less than the minimum threshold width 86, the implement controller may instruct the work vehicle to increase speed to reduce the duration associated with the seeding process.

Furthermore, the implement controller may determine that the soil profile is less smooth than desired if a depth 88 of the trench 78 is greater than a maximum threshold depth 90. Conversely, the implement controller may determine that the soil profile is smoother than desired if the depth 88 of the trench 78 is less than a minimum threshold depth 92. By way of example, while the trench depth 88 is greater than the maximum threshold depth 90, the implement controller may instruct the work vehicle to decrease speed to provide a smoother soil finish. Conversely, while the trench depth 88 is less than the minimum threshold depth 92, the implement controller may instruct the work vehicle to increase speed to reduce the duration associated with the seeding process.

In addition, the implement controller may determine that the soil profile is less smooth than desired if a width 94 of the pile 80 is greater than a maximum threshold width 96. Conversely, the implement controller may determine that the soil profile is smoother than desired if the width 94 of the pile 80 is less than a minimum threshold width 98. By way of example, while the pile width 94 is greater than the maximum threshold width 96, the implement controller may instruct the work vehicle to decrease speed to provide a smoother soil finish. Conversely, while the pile width 94 is less than the minimum threshold width 98, the implement controller may instruct the work vehicle to increase speed to reduce the duration associated with the seeding process.

The implement controller may also determine that the soil profile is less smooth than desired if a height 100 of the pile 80 is greater than a maximum threshold height 102. Conversely, the implement controller may determine that the soil profile is smoother than desired if the height 100 of the pile 80 is less than a minimum threshold height 104. By way of example, while the pile height 100 is greater than the maximum threshold height 102, the implement controller may instruct the work vehicle to decrease speed to provide a smoother soil finish. Conversely, while the pile height 100 is less than the minimum threshold height 104, the implement controller may instruct the work vehicle to increase speed to reduce the duration associated with the seeding process.

Figure 5:
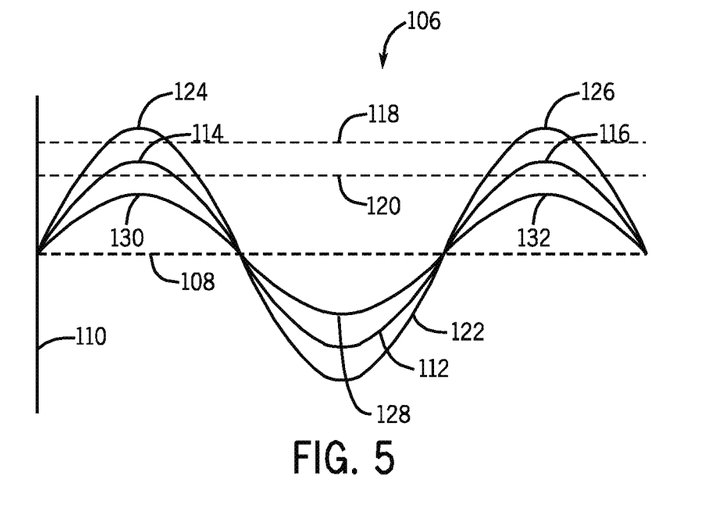
FIG. 5 is an exemplary graph of force applied to an element of the row unit of FIG. 2.

FIG. 5 is an exemplary graph 106 of force applied to an element of the row unit of FIG. 2. In the illustrated graph 106, the x-axis 108 is representative of time, and the y-axis 110 is representative of force. In addition, a curve 112 represents a contact force on an element (e.g., opener, closing disk, etc.) of the row unit as a function of time. As illustrated, the contact force varies with time due to variations in the soil composition/density. In the illustrated embodiment, the curve 112 includes a first peak 114, and a second peak 116, each indicative of a maximum force applied to the row unit element.

The graph 106 also includes a maximum threshold force 118, and a minimum threshold force 120. The maximum threshold force 118 corresponds to an upper bound of a desired soil finish smoothness range. That is, operating the row unit such that the element experiences a force greater than the maximum threshold force 118 may result in an undesirably rough soil finish. Conversely, the minimum threshold force 120 corresponds to a lower bound of a desired soil finish smoothness range. That is, operating the row unit such that the element experiences a force less than the minimum threshold force 120 may result in an undesirably smooth soil finish. Because the peaks 114 and 116 of the curve 112 are between the minimum and maximum threshold forces, a force profile corresponding to the curve 112 establishes a soil finish having a desired smoothness.

The graph 106 also includes a second force curve 122 having a first peak 124 and a second peak 126. As illustrated, the contact force corresponding to the peaks 124 and 126 is greater than the maximum threshold force 118. Accordingly, if such a contact force profile is detected, the implement controller may instruct the work vehicle to decrease the towing speed of the implement, and/or decrease an angle of the opener to establish the desired soil finish. Once the desired soil finish is established, the contact force may be reduced below the maximum threshold force 118.

Furthermore, the graph 106 includes a third force curve 128 having a first peak 130 and a second peak 132. As illustrated, the contact force corresponding to the peaks 130 and 132 is less than the minimum threshold force 120. Accordingly, if such a contact force profile is detected, the implement controller may instruct the work vehicle to increase the towing speed of the implement, and/or increase an angle of the opener to establish the desired soil finish. Once the desired soil finish is established, the contact force may be increased above the minimum threshold force 120. By automatically controlling the surface finish, the control system may establish a desired smoothness across a field, thereby enhancing the accuracy of seed placement, and improving crop development.

Figure 6:
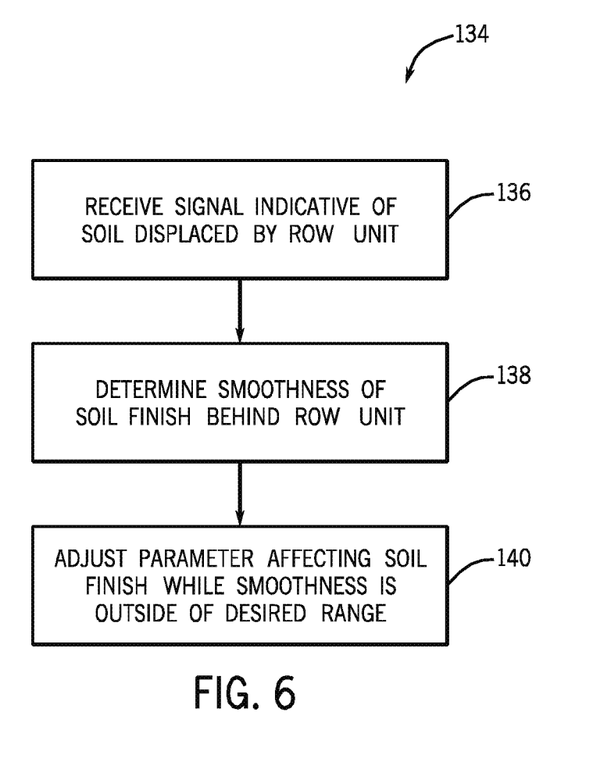
FIG. 6 is a flow diagram of an embodiment of a method for controlling soil finish from an agricultural implement.

FIG. 6 is a flow diagram of an embodiment of a method 134 for controlling soil finish from an agricultural implement. First, as represented by block 136, a signal indicative of soil displaced by a row unit as the row unit moves along a direction of travel is received. As previously discussed, the signal may be received from a non-contact sensor directed toward a region of the soil behind the row unit along the direction of travel. The signal may also be received from a sensor configured to measure contact force between an element of the row unit (e.g., opener, closing disk, etc.) and the soil.

Next, as represented by block 138, a smoothness of a soil finish behind the row unit along the direction of travel is determined based on the signal. As previously discussed, the smoothness may be determined based on a width of the seed trench, a depth of the seed trench, a width of the soil pile adjacent to the seed trench, and/or a height of the soil pile adjacent to the seed trench. A parameter affecting the soil finish is then adjusted while the smoothness is outside of a desired range, as represented by block 140. For example, adjusting the parameter affecting the soil finish may include determining a desired speed of the agricultural implement based on the smoothness of the soil finish, and sending a signal indicative of the desired speed to a work vehicle controller. In this manner, the implement may be towed across a field at a speed that produces a desired soil finish. Adjusting the parameter affecting the soil finish may also include adjusting an angle of an opener relative to the soil surface, thereby establishing a desired soil finish. Establishing the desired soil finish may facilitate accurate seed placement, thereby enhancing crop development.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
a row unit configured to deposit agricultural material into soil along a direction of travel;
a sensor configured to output a first signal indicative of the soil displaced by the row unit, wherein the sensor comprises a non-contact sensor directed toward a region of the soil behind the row unit along the direction of travel; and
an implement controller communicatively coupled to the non-contact sensor, wherein the implement controller is configured to determine a smoothness of a soil finish behind the row unit along the direction of travel based on the first signal, and the implement controller is configured to adjust a parameter affecting the soil finish while the smoothness is outside of a desired range.

2. The agricultural implement system of claim 1, wherein the parameter affecting the soil finish comprises a speed of the agricultural implement system, and the implement controller is configured to output a second signal indicative of a desired speed to a work vehicle controller.

3. The agricultural implement system of claim 1, wherein the row unit comprises an opener, and the parameter affecting the soil finish comprises an angle of the opener relative to a surface of the soil.

4. The agricultural implement system of claim 1, comprising a load sensor configured to output a third signal indicative of a contact force between an element of the row unit and a surface of the soil, wherein the implement controller is configured to determine the smoothness of the soil finish behind the row unit along the direction of travel based on the first signal and the third signal.

5. The agricultural implement system of claim 4, wherein the element of the row unit comprises a closing disk of a closing disk assembly.

6. The agricultural implement system of claim 4, wherein the element of the row unit comprises an opener.

7. The agricultural implement system of claim 1, wherein the non-contact sensor is configured to monitor a height, a width, or a combination thereof, of the soil displaced by the row unit.

8. The agricultural implement system of claim 1, wherein the non-contact sensor comprises an optical camera.

9. The agricultural implement system of claim 1, comprising a plurality of row units, wherein the non-contact sensor is configured to output a respective first signal indicative of the soil displaced by each row unit.

10. The agricultural implement system of claim 1, comprising a plurality of row units, and a corresponding plurality of non-contact sensors, wherein each non-contact sensor is configured to output a respective first signal indicative of the soil displaced by each row unit.

11. A method for controlling soil finish from an agricultural implement system, comprising:
receiving a signal from a non-contact sensor indicative of soil displaced by a row unit of the agricultural implement system as the row unit moves along a direction of travel;
determining a smoothness of the soil finish behind the row unit along the direction of travel based on the signal; and
adjusting a parameter affecting the soil finish while the smoothness is outside of a desired range.

12. The method of claim 11, wherein adjusting the parameter affecting the soil finish comprises:
determining a desired speed of the agricultural implement system based on the smoothness of the soil finish; and
sending a second signal indicative of the desired speed to a work vehicle controller.

13. The method of claim 11, wherein adjusting the parameter affecting the soil finish comprises adjusting an angle of an opener of the row unit relative to a soil surface.

14. The method of claim 11, wherein the non-contact sensor is configured to monitor a height, a width, or a combination thereof, of the soil displaced by the row unit.

15. The method of claim 11, wherein the non-contact sensor comprises an optical camera.

16. An agricultural implement system, comprising:
a row unit configured to deposit agricultural material into soil along a direction of travel;
a non-contact sensor directed toward a region of the soil behind the row unit along the direction of travel, wherein the non-contact sensor is configured to output a first signal indicative of a smoothness of a soil finish within the region; and
an implement controller communicatively coupled to the non-contact sensor, wherein the implement controller is configured to determine a desired speed of the agricultural implement system based on the first signal, and to output a second signal indicative of the desired speed to a work vehicle controller.

17. The agricultural implement system of claim 16, wherein the non-contact sensor is configured to monitor a height, a width, or a combination thereof, of the soil displaced by the row unit.

18. The agricultural implement system of claim 16, wherein the non-contact sensor comprises an optical camera.

19. The agricultural implement system of claim 16, wherein the row unit comprises an opener, and the implement controller is configured to adjust an angle of the opener relative to a surface of the soil based on the first signal.

20. The agricultural implement system of claim 16, comprising a load sensor configured to output a third signal indicative of a contact force between an element of the row unit and a surface of the soil, wherein the implement controller is configured to determine the desired speed of the agricultural implement system based on the first signal and the third signal.

* * * * *